United States Patent [19]
Fujita et al.

[11] Patent Number: 5,513,110
[45] Date of Patent: Apr. 30, 1996

[54] NAVIGATION SYSTEM AND PATH SEARCH METHOD USING HIERARCHIZED ROAD DATA

[75] Inventors: Takehiro Fujita, Kokubunji; Takashi Nomura, Chigasaki, both of Japan

[73] Assignees: Xanavi Informatics Corporation, Zama; Hitachi, Ltd., Tokyo, both of Japan

[21] Appl. No.: 272,493

[22] Filed: Jul. 8, 1994

[30] Foreign Application Priority Data

Jul. 9, 1993 [JP] Japan .................................. 5-170643

[51] Int. Cl.$^6$ .................................................. G06F 165/00
[52] U.S. Cl. ......................... 364/449; 364/444; 340/990; 340/995
[58] Field of Search .................................. 364/443, 444, 364/449; 73/178 R; 340/988, 990, 995

[56] References Cited

U.S. PATENT DOCUMENTS 4,716,404  12/1987  Tabata et al. ........................... 340/995
4,984,168   1/1991  Neukrichner et al. .................. 340/995
5,031,104   7/1991  Ikeda et al. ............................. 364/449

(List continued on next page.)

FOREIGN PATENT DOCUMENTS

0372840A3  6/1990  European Pat. Off. .

(List continued on next page.)

OTHER PUBLICATIONS

Niwa et al., "Path Finding Algorithm Based on the Hierarchical Representation of a Road Map and its Application to a Map Information System," *Bulletin of the Japan Institute of Information Processing*, 32:5, 659–999, May 1990.
Kato et al., "An Intelligent Route Search Method through Accessibility Index," *Resume for the 45th National Meeting of Japan Institute of Information Processing*, 6N–2:1, 413–414, Oct. 11–14.

Kato et al., "The Comparison among the Route Search Methods for the Nationwide Road Networks of Japan," *Resume for the 46th National Meeting of Japan Institute of Information Processing*, 8Q–2:1, 381–382, Mar. 23–26, 1993.
Kato et al., "A Route Search Method Restricting the Search Area by the Particular Meshes for the Nationwide Road Networks of Japan," *Resume for the 46th National Meeting of Japan Institute of Information Processing*, 8Q–2:1, 383–384, Mar. 23–26, 1993.

*Primary Examiner*—Gary Chin
*Attorney, Agent, or Firm*—Pennie & Edmonds

[57] ABSTRACT

A navigation system in which a more preferable path can be quickly searched for by using map data in a form easy of maintenance, and which is well suited for installation on a vehicle. A map data memory unit stores therein the road data of roads which belong to management areas, for each of the management areas of predetermined extent and shape and for each of hierarchies corresponding to sorts of the roads. A path search/guidance control unit searches for the path which extends from a current point decided by a positioning unit, to a destination point set by a set input unit. The pat search is made in such a way that nodes connecting with the roads in higher hierarchies and paths extending to the nodes are searched for from the current point and from the destination point, sequentially in the respective hierarchies from the hierarchies corresponding to the current point and the destination point up to the hierarchy corresponding to a distance between the point of departure and the destination point, the connecting nodes and the extending paths being searched for as to each of the respective hierarchies and on the basis of the road data of the pertinent hierarchy relevant to the management areas which lie within limits of a size corresponding to the pertinent hierarchy, and that a path is searched for between the nodes which have been searched for and which connect with the roads in the hierarchy corresponding to the distance between the point of departure and the destination point. Further, the path search/guidance control unit gives a guidance suggestion on a display unit through a display control unit.

6 Claims, 14 Drawing Sheets

U.S. PATENT DOCUMENTS

| | | | |
|---|---|---|---|
| 5,036,471 | 7/1991 | Tamura et al. | 364/449 |
| 5,168,452 | 12/1992 | Yamada et al. | 364/444 |
| 5,272,638 | 12/1993 | Martin et al. | 364/444 |
| 5,285,391 | 2/1994 | Smith, Jr. et al. | 364/443 |

FOREIGN PATENT DOCUMENTS

| | | |
|---|---|---|
| 0575943A1 | 12/1993 | European Pat. Off. . |
| 4212884A1 | 10/1992 | Germany . |
| 1-219610 | 9/1989 | Japan . |
| 2-306400 | 12/1990 | Japan . |
| 3-188316 | 8/1991 | Japan . |
| 3230299 | 10/1991 | Japan . |
| 4-204168 | 7/1992 | Japan . |
| WO93/03452 | 2/1993 | WIPO . |

313 MULTILEVEL CROSSING

310~312 : SORTS OF INTERSECTIONS

○ INTERSECTION BETWEEN ROADS OF IDENTICAL LEVEL
⊘ INTERSECTION WITH ROAD OF HIGHER LEVEL
● INTERSECTION BETWEEN ROADS OF HIGHER LEVEL

| HIERARCHY #1 | EXPRESS HIGHWAYS |
| | NATIONAL ROADS |
| HIERARCHY #2 | MAJOR LOCAL ROADS, GENERAL ROADS (AT LEAST 5.5 [m] WIDE) |
| HIERARCHY #3 | NARROW ROADS (NARROWER THAN 5.5 [m]) |

□ POINT OF DEPARTURE
△ DESTINATION POINT
☐ CANDIDATE AREA TO-BE-SEARCHED

▨ MANAGEMENT AREAS SELECTED AS CANDIDATE AREA TO-BE-SEARCHED

● STARTING POINT OF SEARCH AT HIGHER LEVEL

D=MAXIMUM ( D1  D2  D3  D4 )

DIRECTION OF DESTINATION POINT

□ POINT OF DEPARTURE
△ DESTINATION POINT
▨ AREA TO-BE-SEARCHED

— APPROPRIATE PATH WHICH CANNOT BE SELECTED

— ROADS OF HIGHER LEVEL
— ROADS OF LOWER LEVEL

BLOCKS OF HIGHER LEVEL

BLOCKS OF LOWER LEVEL

ADDED

DELETED

DIVISION OF SINGLE BLOCK

MERGENCE OF BLOCKS

○ NODE (INTERSECTION)

◌ MULTILEVEL CROSSING (NOT INTERSECTION)

□ POINT OF DEPARTURE
△ DESTINATION POINT

PATH WHICH CANNOT BE SELECTED

NAVIGATION SYSTEM AND PATH SEARCH METHOD USING HIERARCHIZED ROAD DATA

BACKGROUND OF THE INVENTION

The present invention relates to navigation technology. More particularly, it relates to an in-vehicle navigation system which searches for a recommendable path complying with a given final destination, and which teaches the driver of a vehicle the current position of the vehicle and the traveling direction thereof along the recommended path.

Techniques for searching a recommendable path extending from a point of departure (namely, an origin or a starting point) to a destination point, have been known from the official gazette of Japanese Patent Application Laid-open No. 306400/1990, and a paper entitled "Path Search Algorithm based on Hierarchical Expression of Road System and Application to Map Information Processing System" (Bulletin of the Japan Institute of Information Processing, Vol. 32, No. 5, pp. 659–666, March 1990).

As illustrated in FIG. 14A, the technique disclosed in the official gazette of Japanese Patent Application Laid-open No. 306400/1990 divides a map into unit areas each having predetermined size and shape (into individual square cells shown in the figure) and it makes a path search based upon the map data of the unit areas. Herein, when the point of departure and the destination point exist in different unit areas path search is made by setting any of the following as a search area (an area to-be-searched):

(1) Unit areas which are traversed by a straight line joining both the points;

(2) Unit areas which are traversed by a straight line joining both the points, and unit areas which adjoin the former unit areas;

(3) Among unit areas traversed by a straight line joining both the points and the unit areas adjoining the former unit areas, the unit areas each of which adjoins at least two other unit areas.

On the other hand, according to the technique stated in the paper entitled "Path Search Algorithm based on Hierarchical Expression of Road System and Application to Map Information Processing System", as illustrated in FIG. 15A, road data are successively hierarchized into a plurality of hierarchies such as express highways, national roads and small local roads. In each of the hierarchies thus mentioned, a closed area (block) surrounded with and comprising roads of higher hierarchy is managed as the lower-level block of that block of the higher hierarchy. Herein, the path is searched for every block and in a stepwise manner from the block of the lower hierarchy to the block of the higher hierarchy. Besides, in the path search, the path extending to the higher hierarchy is searched for from both the road nearest the point of departure and the road nearest the final destination point.

With the technique disclosed in the official gazette of Japanese Patent Application Laid-open No. 306400/1990, objects to be searched for can be limited. Since, however, roads are omitted, this technique poses the problem that an appropriate path cannot be selected.

By way of example, consider a case where an express highway joining the point of departure and the destination point exists as shown in FIG. 14B. In this case, the express highway extends, slightly, out of the set search area, and since it is not continuous within the search area, it cannot be selected. Thus, there is a high possibility that the more preferable path will fail to be selected notwithstanding that express highways, national roads and general roads are usually more suitable for travels in the order mentioned.

Meanwhile, the omission of the roads is reduced, when the size of each unit area is increased, but this leads to an increase in the number of objects to be searched.

On the other hand, the technique stated in the paper entitled "Path Search Algorithm based on Hierarchical Expression of Road System and Application to Map Information Processing System" has problems concerning difficulty in maintenance of road data.

More specifically, as illustrated in FIG. 15B, in a case where a road has been added or deleted at any hierarchical level other than the lowermost level, the block which belongs to the lower hierarchy of the block of the added or deleted road must be reorganized by the division of the single block or the mergence of the blocks.

Another problem is that the identification of the adjacent blocks is difficult because the area of the individual management blocks are nonuniform, and the numbers of the adjacent blocks usually becomes nonuniform.

Consequently, in a case where the map information processing system guides the vehicle during the running thereof by displaying the map on a display unit, it is difficult to scroll a screen and display the next block with the movement of the vehicle. Therefore, the technique used in this system is not suited for use on vehicles.

Moreover, the roads are not managed for extending blocks of the same hierarchy, but the path extending to the road of higher level is searched for every block, followed by the path search in the higher hierarchy. A problem is thus presented, when the multilevel crossing between the road of higher level and the road of lower level is existent, the connection of the lower-level road common to the blocks is lost. In a case as shown in FIG. 15C where the point of departure and the destination point have been set on the road which bridges the blocks and which forms the multilevel crossing with the higher-level road being the boundary of these blocks, the path containing such a road cannot be searched for in spite of it being the optimum path.

SUMMARY OF THE INVENTION

In view of the prior art, the object of the present invention is to provide a navigation system in which a more preferable path can be quickly searched using a map data format that is easy to maintain.

In order to accomplish the object, according to the present invention, a navigation System for installation on a vehicle comprises: storage means for storing therein road data of roads which belong to management areas, for each of the management areas being geographical areas of predetermined extent and shape and for each of hierarchies corresponding to types of roads; positioning means for detecting a current point and a traveling direction of the vehicle; set input means for accepting setting of a destination point; path search means for searching for a path which extends from a given point of departure to the destination point; and guidance means for guiding running of the vehicle on the basis of the current point measured by the positioning means and the path searched for by the path search means; the path search means making the search for the path sequentially in the respective hierarchies, as to each of the respective hierarchies and on the basis of the road data of the pertinent hierarchy relevant to at least one of the management areas as lies within limits having a size which corresponds to the pertinent hierarchy.

Besides, such a navigation system, the path search means should desirably make the path search in such a way that nodes connecting the roads in higher hierarchies and paths extending to the nodes are searched for from the point of departure and from the destination point, sequentially in the respective hierarchies from the hierarchies corresponding to the point of departure and the destination point up to the hierarchy corresponding to a distance between the point of departure and the destination point, the connecting nodes and the extending paths being searched for as to each of the respective hierarchies and on the basis of the road data of the pertinent hierarchy relevant to at least one of the management areas, as lies within the limits having the size which corresponds to the pertinent hierarchy, and that a path is searched for between the nodes which have been searched for and which connect with the roads in the hierarchy corresponding to the distance between the point of departure and the destination point.

According to the navigation system of the present invention, the road data of the roads belonging to the management areas are stored for each of the management areas which have the predetermined extent and shape and which are easy to maintain, and for each of the hierarchies which correspond to the sorts of the roads. In searching for the path, an area to be searched is limited to the size which corresponds to each of the hierarchies. Under this condition, the path is searched sequentially in the respective hierarchies, as to each of the respective hierarchies and on the basis of the road data of the pertinent hierarchy relevant to at least one of the management areas as lies within the limits.

PREFERRED EMBODIMENTS OF THE INVENTION

Now, one embodiment of a navigation system according to the present invention will be described in conjunction with the accompanying drawings.

Figure 1:
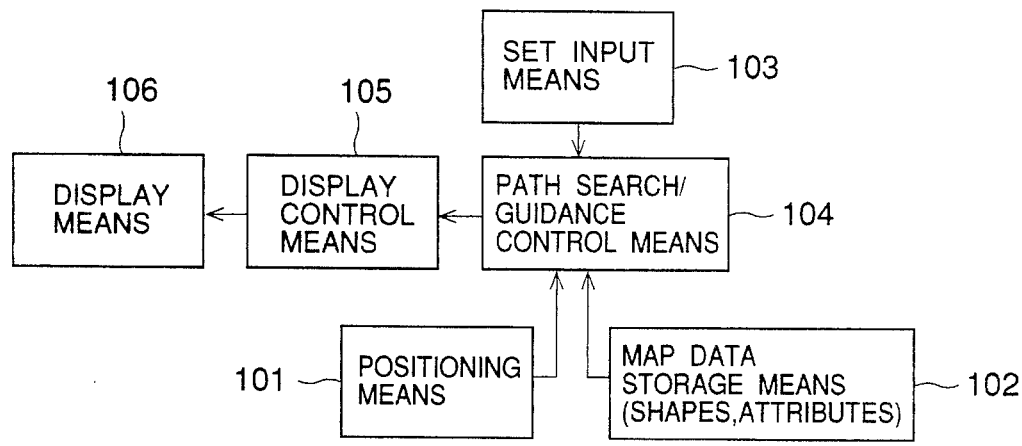
FIG. 1 is a block diagram showing the construction of a navigation system in an embodiment of the present invention.

FIG. 1 illustrates the construction of the navigation system in this embodiment.

Referring to the figure, positioning means 101 includes a geomagnetic sensor, a gyro sensor, a GPS (global positioning system) sensor or the like, and the positioning means executes a map matching process etc. so as to detect the current position of a vehicle on which the navigation system is installed. Map data storage means 102, such as a CD-ROM (compact-disk read-only memory), stores therein map data relating to map information. Set input means 103 includes switches of mechanical type, photoelectric type or the like, and it accepts the setting of the destination point (or end point) of the vehicle. Path search/guidance control means 104 searches for a path or route, and controls a guidance display on the basis of the path searched for. Display control means 105 controls the display on display means 106, such as a CRT (cathode-ray tube) or LCD (liquid-crystal display), under the control of the path search/guidance control means 104.

Figure 2:
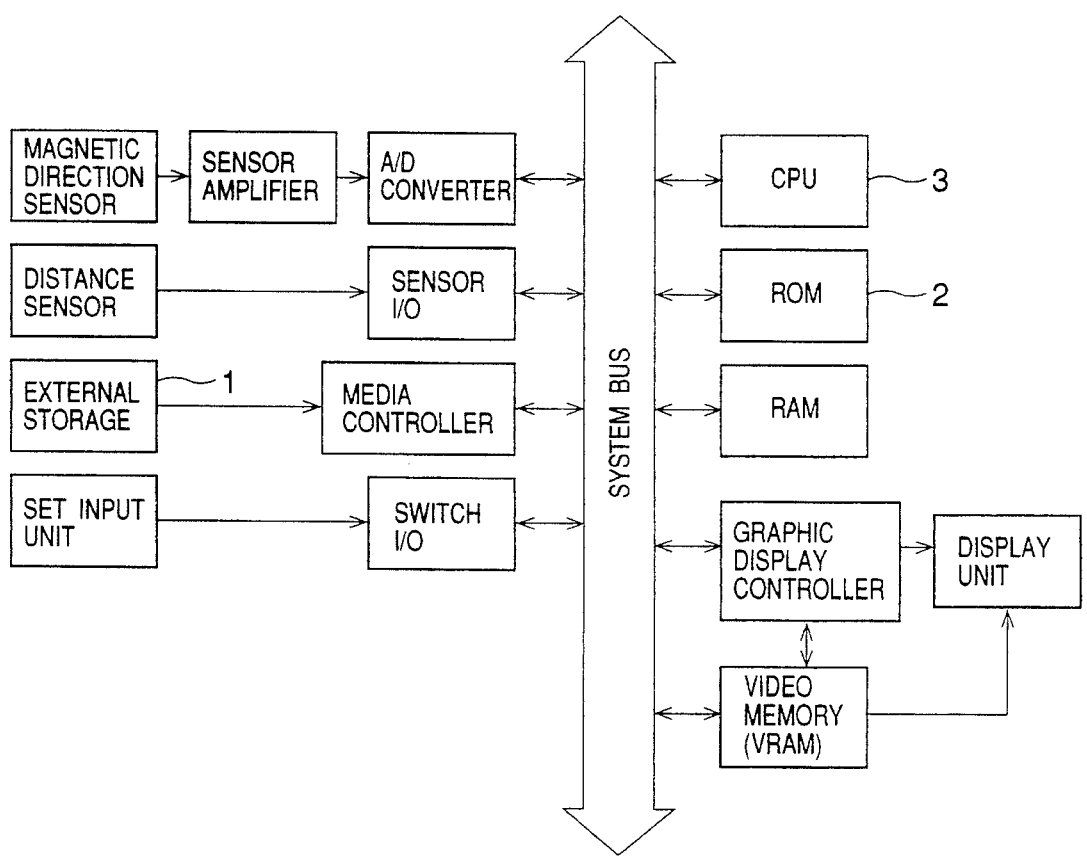
FIG. 2 is a block diagram showing an example of the hardware architecture of the navigation system.

The navigation system in this embodiment may well be implemented by a hardware architecture as shown in FIG. 2. Herein, a microcomputer circuit is principally configured of a ROM 2 in which programs such as path search and guidance programs are stored, a CPU (central processing unit) 3 which executes the programs, and a RAM (random access memory) which is used as the work area of the CPU 3. The following are connected to the microcomputer circuit by respectively suitable means: sensors incorporating an external storage, such as CD-ROM, 1 storing map data therein; a display unit such as CRT or LCD; and an input/output device such as set input unit.

Figures 3A, 3B:
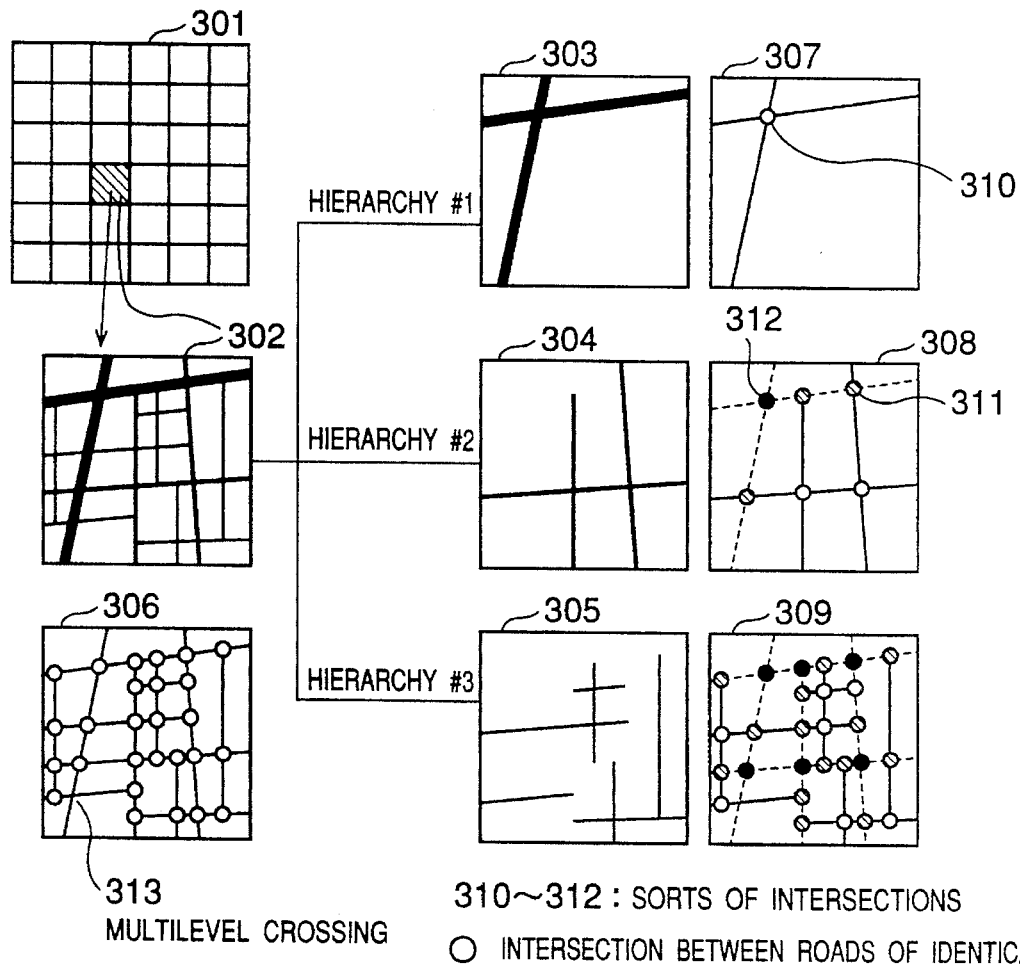
FIGS. 3A and 3B are diagrams for determining the concept of road data management in the navigation system.

The navigation system in this embodiment manages the map data as illustrated in FIGS. 3A and 3B.

In FIG. 3A, numeral 301 indicates one section or compartment of the map data. Such sections are obtained by dividing the map into units of a predetermined width in longitude and latitude. Each of the sections is identified for management with a management number based on the longitude and latitude of the left lower corner point of the particular section. Accordingly, the adjacent the sections can be identified with ease.

Each section is subdivided into areas in units of predetermined width in longitude and latitude. The areas are set as management areas, which are utilized for management within the particular section.

In the case of FIG. 3A, numeral 302 designates one management area lying in the section 301, and numeral 306 designates road data contained in the management area 302. That is, 302 is an enlarged view of 301 and 306 is an enlarged view of 302. As illustrated in the figure, the road data comprises road shape data (a plane coordinate array in which the roads are expressed by random array of lines), and network data consisting of nodes showing intersections and links showing the relationship between the intersections.

The types of individual roads are also registered in the shape data. In addition, a node number is assigned to each of the nodes, which permits the particular node to be uniquely identified. Even when the connection between the nodes bridges the adjacent management areas, the node numbers of the connecting nodes are registered in the corresponding links.

In this embodiment, the road data of the management areas 302 are hierarchized for the respective sorts of the roads, and the resulting hierarchies are utilized for management. By way of example, as tabulated in FIG. 3B, express highways and national roads are set as hierarchy #1 at the uppermost level, major local roads and general roads are set as hierarchy #2, and narrow roads each having a width less than 5.5 [m] are set as hierarchy #3 at the lowermost level. However, in a case where the gateway of the express highway is connected with the national road by the road of the hierarchy #2, this road of the hierarchy #2 is brought into the higher hierarchy #1, thereby preventing the discontinuities in road network.

As a consequence of this hierarchizing operation, the roads of the management area 302 are classified into roads 303 which are registered in the hierarchy #1, roads 304 which are registered in the hierarchy #2, and roads 305 which are registered in the hierarchy #3. In accordance with the classification, road data 307 shown in FIG. 3A are registered in the hierarchy #1 of the management area 302, road data 308 in the hierarchy #2 thereof, and road data 309 in the hierarchy #3 thereof.

Here, the road data of each hierarchy to be registered contain not only the shape data but also the node 310 between the roads included in the particular hierarchy as well as the link corresponding to this node 310, and the node 311 between the road included in the particular hierarchy and the road included in the higher hierarchy, as well as the link corresponding to this node 311. Further, when the nodes 311 with the roads of the higher hierarchy are connected by the road of the higher hierarchy, the link between these nodes 311 is also registered. In other words, when the intersection 311 is adjacent, the information of the connection by the road of higher level is also registered. Still further, regarding that node 311 with the road of the higher hierarchy which adjoins the node 312 between the roads of the higher hierarchy (that is, which is joined by the road of the higher hierarchy), the link with the node 312 between the roads of the higher hierarchy is also registered. In other words, regarding the intersection which adjoins the intersection 312, the information of the connection with the intersection of the corresponding higher level is also registered. In a case where the hierarchies are separated for the respective sorts of the roads as tabulated in FIG. 3B and where the node 312 in the higher hierarchy is not registered in the lower hierarchy, the link of the higher hierarchy and that of the lower hierarchy can be associated in such a way that, as to each node 311, the node numbers of both those ends of the higher hierarchy with which the particular node 311 connects are registered. As another hierarchizing method, the higher hierarchy/hierarchies may well be included in each of the hierarchies indicated in FIG. 3B. That is, the road data can be classified into (1) hierarchy #1, hierarchy #1, (2) hierarchy #1+hierarchy #2, and (3) hierarchy #1+hierarchy #2+hierarchy #3 (all the roads) by way of example. In this case, the nodes 312 of the higher hierarchies are registered in the lower hierarchies.

In a case where the node or link to be registered is in any management area different from the particular management area (302 in FIG. 3A), it is similarly registered.

In addition, the distance between nodes and an average passing time period are registered as the factors of a passing cost in each road link.

Thus, in this embodiment, the road network included in the management area 302 is expressed by the three hierarchies. On this occasion, the size of one management area may well be changed for each of the hierarchies. More specifically, the volumes of data are smaller in the higher hierarchies. Therefore, it is allowed, by way of example, to manage the hierarchy #3 in units of the single management area 302, to manage the hierarchy #2 with n*n (where letter n denotes an integer greater than one) management areas 302 set as one management area, and to manage the hierarchy #1 with N*N (where letter N denotes an integer greater than the integer n) management areas 302 set as one management area.

Meanwhile, when the hierarchical levels of roads are set as tabulated in FIG. 3B, the road at the higher level is more suited to the movement of the vehicle, and the density of road data in one management area is lower (the number of intersections is smaller) as to this road. Therefore, when a path is to be selected, a search for the path is preferentially promoted to the higher hierarchy road, that is, it is replaced with a search at the higher level, whereby the number of nodes to be searched for can be limited, and the path suited to the running of the vehicle can be selected. Under such a principle, accordingly, the path search/guidance control means 104 makes the path search as explained below.

Figure 6:
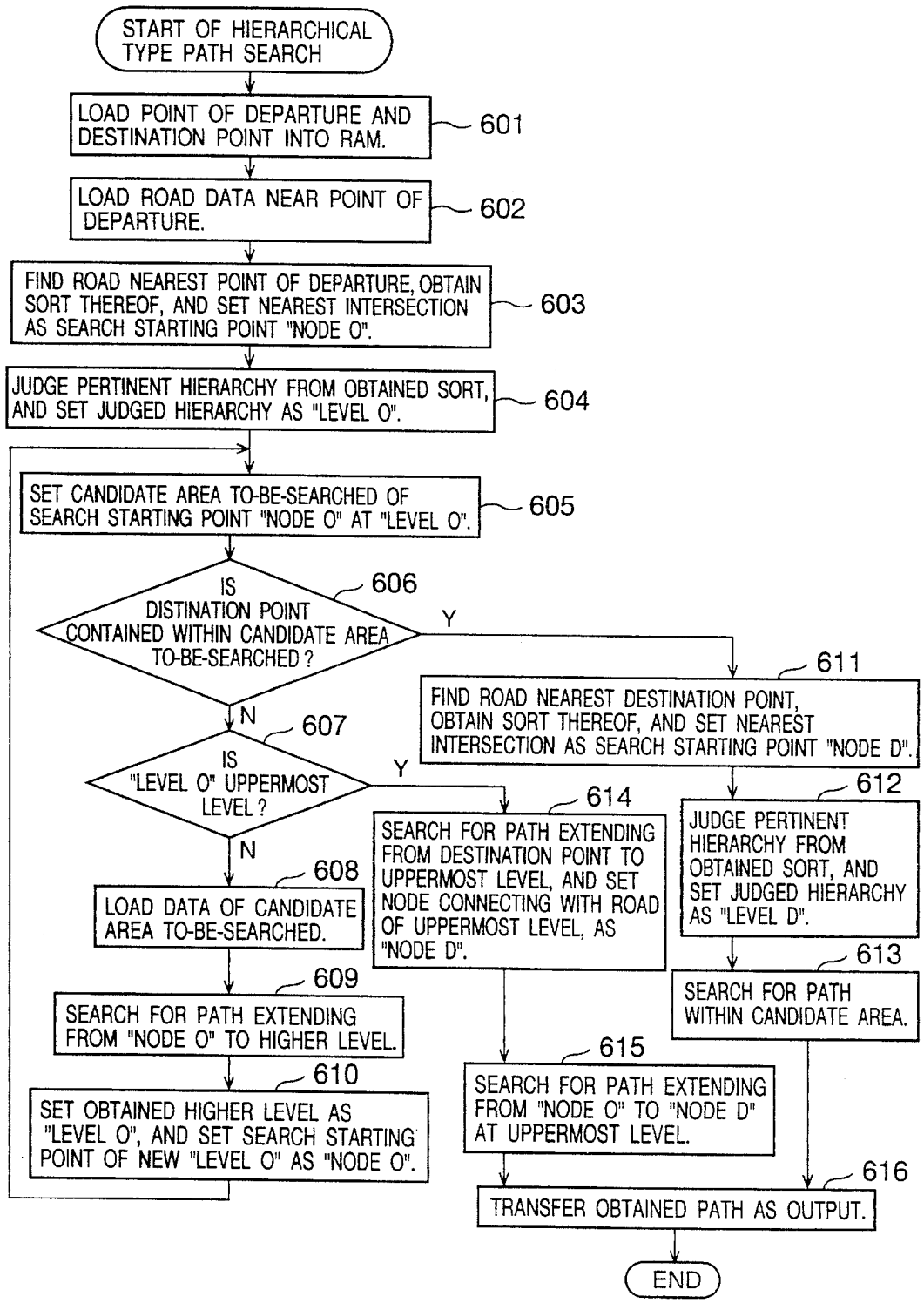
FIG. 6 is a flow chart showing the processing steps of the path search.
Figure 7:
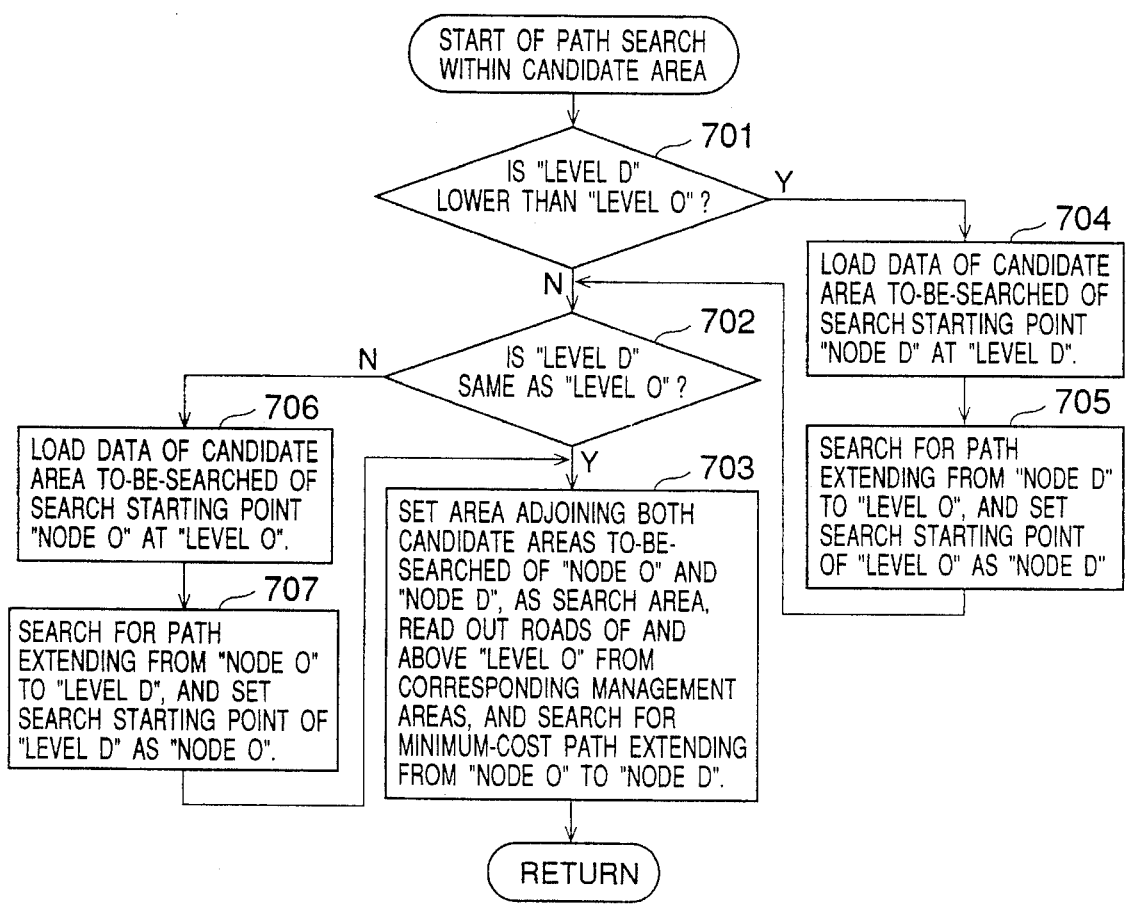
FIG. 7 is a flow chart showing the processing steps of the path search which is made within a candidate area.
Figure 8:
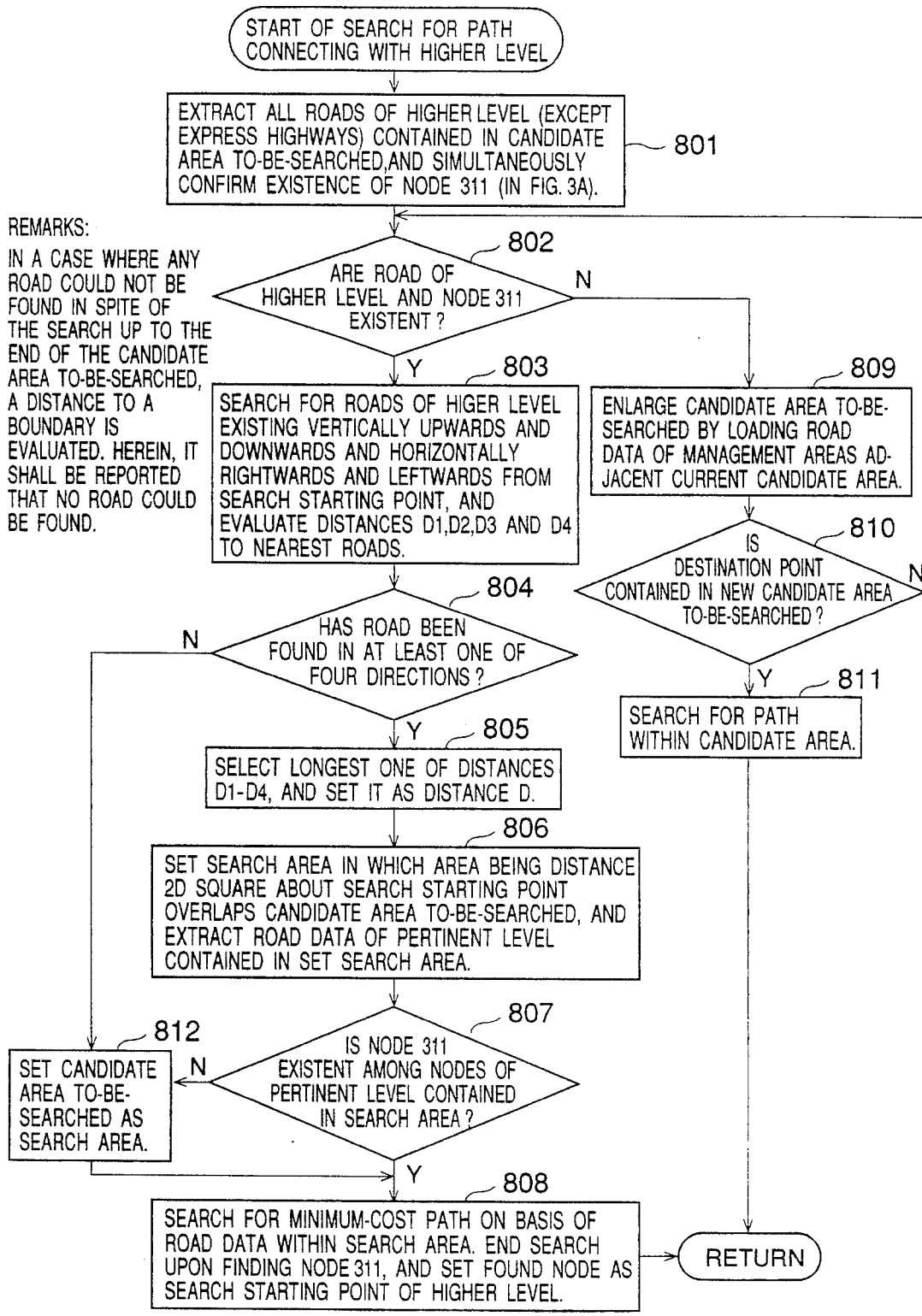
FIG. 8 is a flow chart showing the processing steps of the search for a path which extends to a road of higher hierarchy.

FIGS. 6, 7 and 8 illustrate the processing steps of a path search process executed by the path search/guidance control means 104.

Figure 4A:
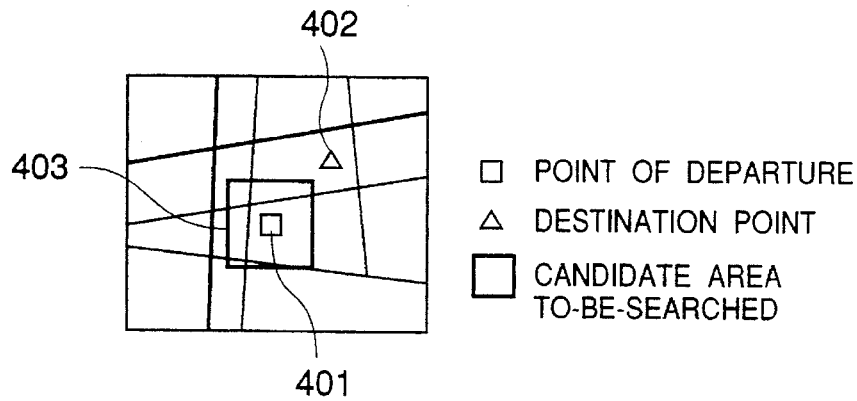
FIGS. 4A through 4G are diagrams showing the situation of a path search.

First, a destination point 402 shown in FIG. 4A as set by the set input means 103 is referred to (step 601), and the path search is started from a point of departure 401 shown in FIG. 4A (steps 602 to 610). In the case of an in-vehicle navigation system, the point of departure 401 is the current position of the vehicle measured by the positioning means 101.

Subsequently, a road and an intersection which are nearest the point of departure 401 are determined, and the nearest intersection is set as a search starting point "NODE O (origin)". The hierarchy to which the nearest road belongs is set as a hierarchy "LEVEL O" (steps 603 and 604). Further, one or more management areas around the search starting point "NODE O" in accordance with hierarchy "LEVEL O" are set as a candidate search area to-be-searched (a candidate for a search area to-be-searched) "O" (403 in FIGS. 4A and 4B) (step 605). If the destination point 402 is contained in the candidate search area "O" the point 403 is checked (step 606). Here, the candidate search area "O", is identified with a larger area in the higher hierarchies. By way of example, it is set as follows:

Hierarchy #3: Management areas included in 5 [km$^2$] around the search starting point.

Hierarchy #2: Management areas included in 20 [km$^2$] around the search starting point.

Hierarchy #1: Management areas included in 40 [km$^2$] around the search starting point.

Figure 4B:
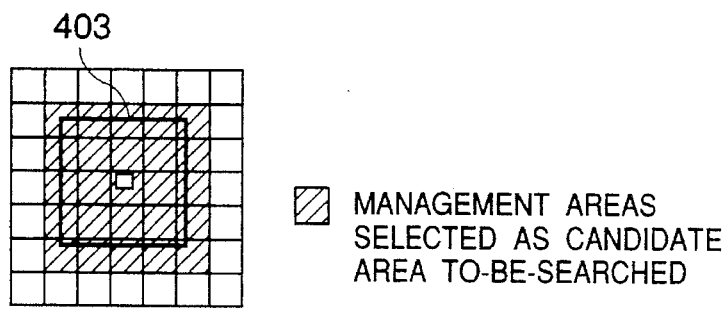
Figure 4C:
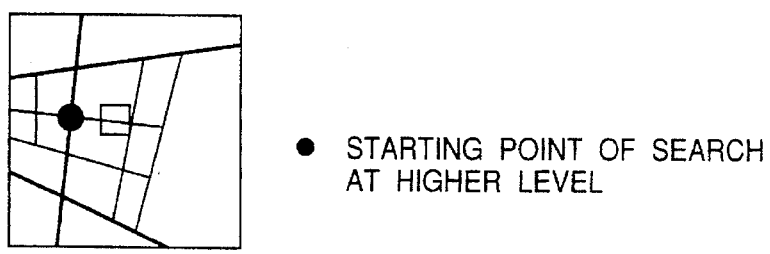

The management areas corresponding to the candidate search area "O" 403 are clearly shown in FIG. 4B. When the destination point 402 is not contained in the candidate search area "O" 403 as seen from FIG. 4A, it is determined that a movement along only the roads of the pertinent hierarchy "LEVEL O" is insufficient. Subsequently, if the hierarchy "LEVEL O" is the uppermost level, it is checked (step 607). When the hierarchy "LEVEL O" is not the uppermost level, the data of the hierarchy "LEVEL O" concerning the candidate search area "O" 403 are read out of the map data storage means 102 (step 608) until the destination point 402 is contained in the candidate search area "O" 403 as seen from FIG. 4D. Next, the path search/guidance control means 104 searches for an intersection (as sown in FIG. 4C) which serves as an entrance from the search starting point "NODE O" to the road of the hierarchy directly higher than the pertinent hierarchy "LEVEL O", and a path which extends to the intersection (step 609) The intersection found is set as a new search starting point "NODE O", and the directly higher hierarchy is set as a new hierarchy "LEVEL O" (step 610). Thereafter, the means 104 iterates the processing of the step 605 at which a new candidate search area to-be-searched "O" corresponding to the new hierarchy "LEVEL O" is set, and the step 606 which decides whether or not the destination point 402 is contained in the new candidate search area "O".

As explained above, the path search is promoted to the higher level stepwise. Incidentally, when the search starting point at the higher level has been found, a node corresponding thereto is added to the higher level. On this occasion, the number of that node adjacent to the node at the higher level is registered as connection information. The numbers of such adjacent nodes are registered as the association information of the links of the higher level and those of the lower level beforehand.

Referring back to FIG. 6, even in the case where the destination point 402 is not contained in the candidate search area "O" 403, a path is searched for in the hierarchy #1 on condition that the hierarchy "LEVEL O" has become the uppermost level (hierarchy #1), when no higher hierarchy exists. More specifically, an intersection serving as an entrance from the destination point to the road of the hierarchy #1 and a path extending to the intersection are searched for, the intersection found is set as a search starting point "NODE D (destination)", and the hierarchy #1 is set as a hierarchy "LEVEL D" (step 614). Subsequently, as illustrated in FIG. 4G, a candidate search area "D" 405 is set around the search starting point "NODE D" hierarchy "LEVEL D" similarly to the candidate search area "O" 403 having been set around the search starting point "NODE O" hierarchy "LEVEL O". An area 406 which adjoins both the candidate search area "O" 403 and the candidate search area "D" 405 is then set as the area to-be-searched (the real search area), and a search for a minimum-cost path is made on the basis of the road data of the hierarchy #1 contained in the search area 406, thereby finding the path which extends from the search starting point "NODE O" to the search starting point "NODE D" (step 615). Thus, the whole path extending from the point of departure 401 to the destination point 402 has been obtained in a sequential fashion. The path is transferred as an output (step 616), whereupon the path search process ends.

Figure 4D:
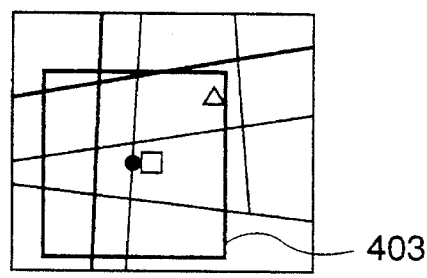

Meanwhile, when it has been decided at the step 606 that destination point 402 is contained in the candidate search area "O" 403 as shown in FIG. 4D, the path search process then starts from the destination point 402.

Figure 4E:
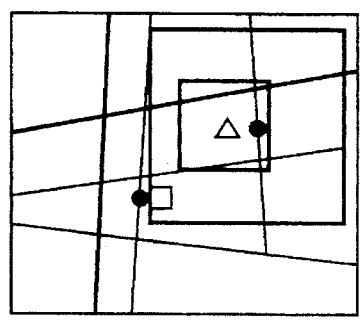

As seen from FIG. 4E, a road and an intersection which are the nearest to destination point 402 are found, and the found intersection is now set as a search starting point "NODE D" (step 611). Further, the hierarchy to which the found road belongs is set as a hierarchy "LEVEL D". One or more management areas around "NODE D" in accordance with hierarchy "LEVEL D" are set as a candidate search area to-be-searched "D" (step 612). Subsequently, a path search is made within the candidate search area "D" (step 613). The result path is transferred as an output (step 616), whereupon the path search process is ended.

The path search within the candidate search area "D" at step 613 proceeds in accordance with a flow chart illustrated in FIG. 7.

Figure 4F:
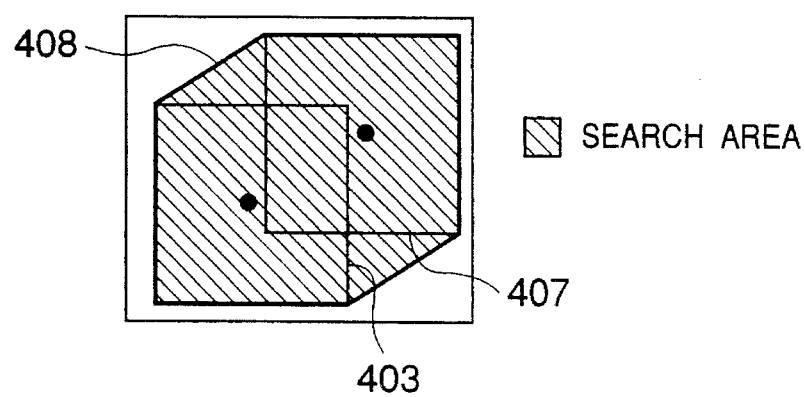
Figure 4G:
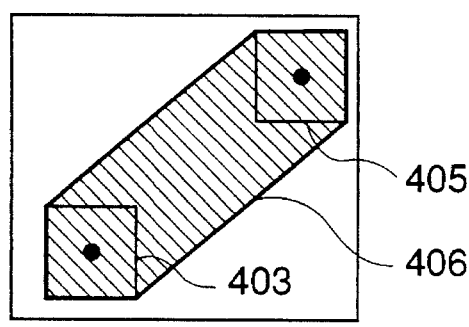

If hierarchy "LEVEL D" is lower in level than hierarchy "LEVEL O" (step 701), road data of hierarchy "LEVEL D" are read out from the map data storage means 102 (step 704). At next step 705, path search/guidance control means 104 searches for an intersection which serves as an entrance from "NODE D" to the road of the pertinent hierarchy "LEVEL O", and a path which extends to the intersection. Herein, the search is made sequentially in the higher hierarchies. Concretely, the intersection found is set as a new search starting point "NODE D", the hierarchy "LEVEL D" is equal to the hierarchy "LEVEL O", and a new candidate search area to-be-searched "D" 407 corresponding to the new hierarchy "LEVEL D" is set as shown in FIG. 4F. Now that the hierarchies "LEVEL D" and "LEVEL O" are the same (step 702), an area 408 (also shown in FIG. 4F) which adjoins both the candidate search area "O" 403 and the candidate search area "D" 407 is set as the search area to-be-searched (the real search area), and a search for the minimum-cost path is made on the basis of the road data of and above the hierarchy "LEVEL O" ("LEVEL D") as are contained in the search area 408, thereby finding the path which extends from the search starting point "NODE O" to the search starting point "NODE D" (step 703). As explained above, the road data of and above the hierarchy "LEVEL O" (="LEVEL D"), such as the data all the hierarchies #1 thru #3 for the hierarchical level #3 or the data of the hierarchies #1 and #2 for the hierarchical level #2, are all extracted. The reason therefore is that the path can be searched for by making the search which is based on, not only the data at the level "LEVEL O" (="LEVEL D"), but also the data at the still higher level. Incidentally, since the density of the data at the higher level is ordinarily lower than the road density at the pertinent lower level, the addition of a road at the higher level poses no problem in the search operation. Moreover, a multilevel crossing (which is not the "intersection" mentioned before) can be coped with by covering the data of the level which has determined the search-area 408.

On the other hand, if hierarchy "LEVEL D" is higher in level than the hierarchy "LEVEL O" (steps 701 and 702), the road data of the hierarchy "LEVEL O" as required for the candidate search area "O" are read out of the map data storage means 102 (step 706). At the next step 707, the path search/guidance control means 104 searches for an intersection which serves as an entrance from the search starting point "NODE D", to the road of the pertinent hierarchy "LEVEL D", and a path which extends to the intersection. Herein, the search is made sequentially in the higher hierarchies. Concretely, the intersection found is set as a new search starting point "NODE O", the hierarchy "LEVEL O" is equalized to the hierarchy "LEVEL D", and a new candidate search area to-be-searched "O" 403 corresponding to the new hierarchy "LEVEL O" is set as shown in FIG. 4F. Subsequently, an area 408 which adjoins both the candidate search area "O" 403 and the candidate search area "D" 407 is set as the search area to-be-searched (the real search area), and a search for the minimum-cost path is made on the basis of the road data of and above the hierarchy "LEVEL D" (="LEVEL O") as are contained in the search area 408, thereby finding the path which extends from the search starting point "NODE O" to the search starting point "NODE D" (step 703).

As explained above, the search for the minimum-cost path is made after the levels of the search starting points "NODE O" and "NODE D" are brought into agreement. The reason therefore is that, if the destination point 402 is near the road of the higher hierarchy, the vehicle should advance from the point of departure 401 up to this higher hierarchy.

In the above processing, each of the steps 609, 705 and 707 searches for the intersection which serves as the entrance from the search starting point to the road of the higher hierarchy, and the path which extends to the intersection. Here, the processing steps of this search operation will be described with reference to FIG. 8.

As indicated in the figure, the roads of the current search level and those of the higher search level contained in the candidate search area to-be-searched are all extracted, and it is confirmed that the road of the higher level exists within the candidate search area (steps 801 and 802). On this occasion, it is confirmed that the intersection (the node 311 in FIG. 3A) with the road of the higher hierarchy is also existent. Herein, however, intersections with the express highways of the hierarchy #1 shall be excluded from the search. The reason therefor is that, since the nodes between express highways and roads of other sorts are limited in number, they are difficult find.

If the road of the higher level does not exist within the candidate search area, this candidate search area is enlarged (step 809). When, as a result of this enlargement, the other search starting point (the destination point as opposed to the point of departure) enters the candidate search area, the path search process ends the search for the intersection, and it shifts to the search within the candidate search area of the higher level (step 611 in FIG. 6) (steps 810 and 811).

Figure 5A:
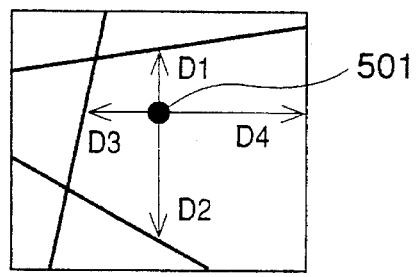
FIGS. 5A through 5D are diagrams showing the situation of the search for a path which extends to a road of higher hierarchy.
Figure 5B:
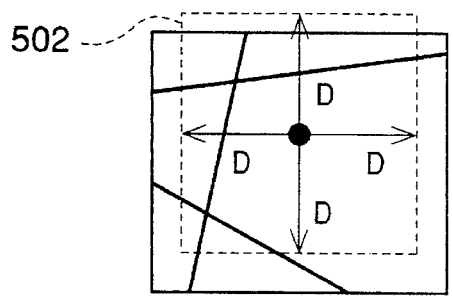
Figure 5C:
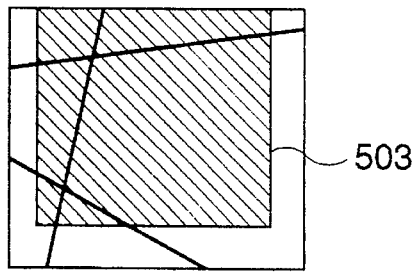

In contrast, if one or more road of the higher level exists within the candidate search area (step 802), it is checked if the roads of the higher level exist in the upper, lower, right and left directions of a search starting point (501 shown in FIG. 5A) (steps 803 and 804). Among the roads of the higher level in the upper, lower, right and left directions, the road which is the farthest from the search starting point has its distance D evaluated (step 805). Subsequently, the range (502 in FIG. 5B) of a regular square center at the search starting point and each side of which is 2D long is obtained, and that part (503 in FIG. 5C) overlaps the candidate search area is set as the search area to-be-searched (the real search area) (step 806). If there is no road at the higher level exists in the upper, lower, right and left directions of the search starting point, the candidate search area is set as the real search area (step 812).

Figure 5D:
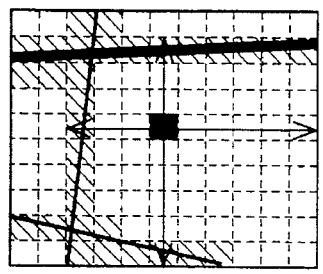

The aforementioned range 502 can be obtained in the following way: As illustrated in FIG. 5D, the candidate search area is divided into meshes, and shape data are registered in the corresponding meshes. In this state, the meshes in the upper, lower, right and left directions are examined beginning with the mesh in which the node of the search starting point is contained.

After the step 806 wherein area 502 is determined, the node 311 connecting with the road of the higher level is found within the search area (step 807), and a minimum-cost path extending to the node 311 is searched for (step 808). In a case where only the multilevel crossing exists within the search area (807), the candidate search area is set as the real search area (812), in which the node 311 connecting with the road of the higher level is found, and a minimum-cost path extending to the found node 311 is searched for (step 808).

Further, if where an intersection connecting with the road of a higher hierarchy and a path extending to the intersection is obtained, the node 311 found is set as a search starting point, the hierarchy to-be-handled is promoted one level higher, and a candidate search area to-be-searched is set in accordance with the new search starting point and the new hierarchy. Thereafter, the above processing is iterated.

Figure 9:
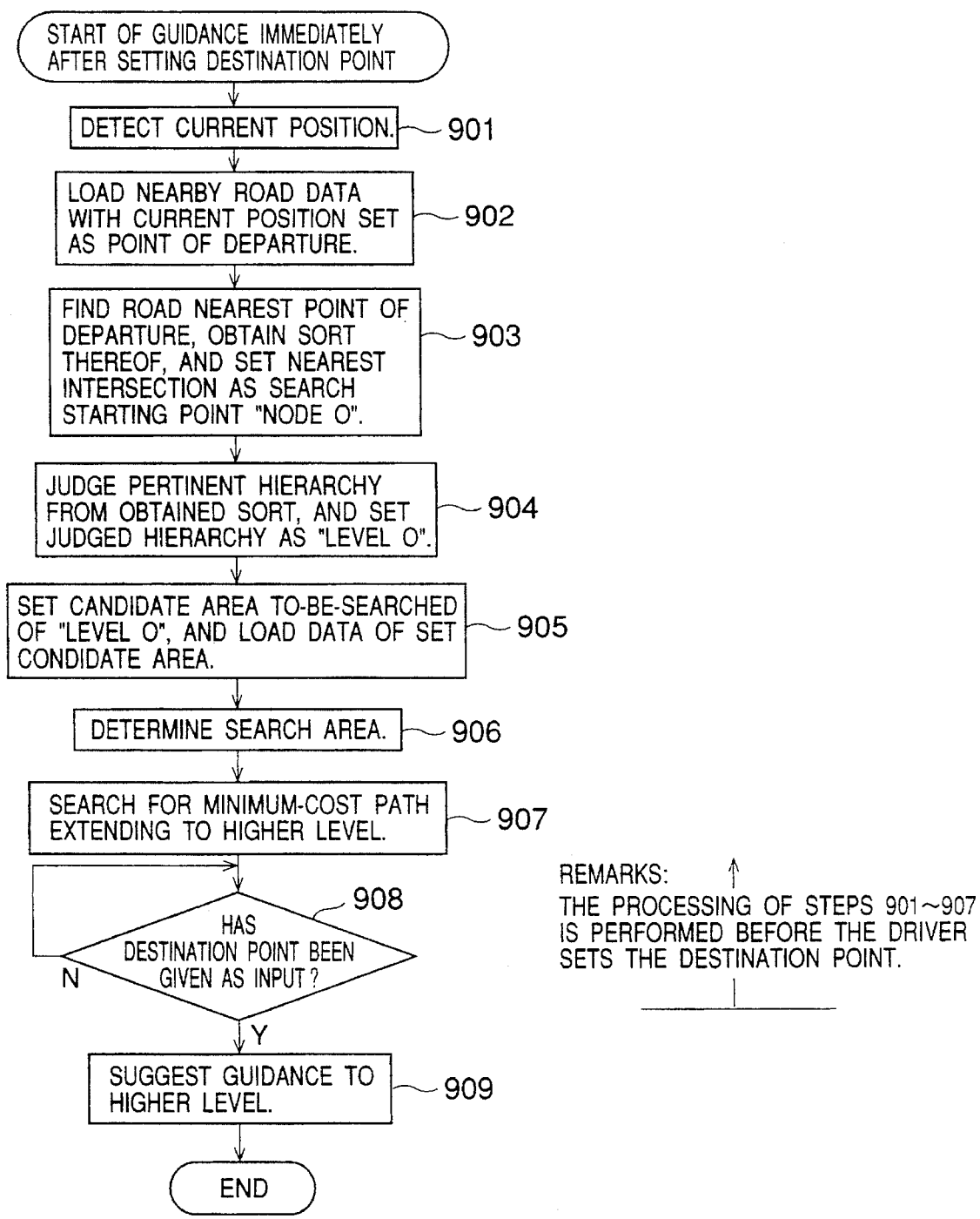
FIG. 9 is a flow chart showing the initial processing steps of a guidance process.

In accordance with the path search process thus far described, an optimum path extending from the point of departure to the destination point can be searched for. Herein, in the case where the navigation system according to this embodiment is installed for the vehicular use, an operation for giving a guidance suggestion may well be permitted to begin immediately after the driver of the vehicle has set the destination point, as illustrated in FIG. 9.

Figure 11A:
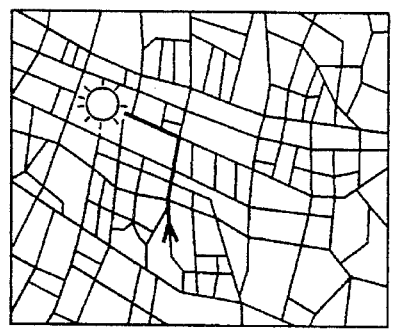
FIGS. 11A through 11C are diagrams each showing an example of a guidance screen.
Figure 11B:
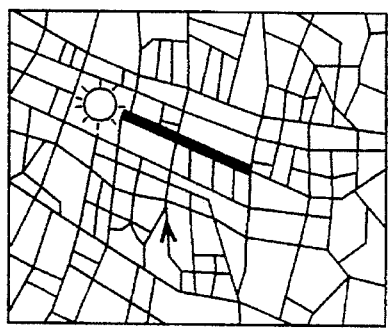

More specifically, when the driver has made a request for a path search/guidance, a path extending to the road of a higher hierarchy is searched for by utilizing the information of the current position of the vehicle, beforehand without waiting for the end of the setting of the destination point (steps 901 thru 907). Thus, the first guidance suggestion can be prepared while the driver is setting the destination point. When the destination point has been set (step 908), the result of the search to the road of the higher hierarchy is offered as the guidance suggestion to the driver for the time being (step 909). If the current position is the road of the uppermost level, a path connecting with an intersection which is nearest the destination point in the traveling direction of the vehicle is offered as the temporary guidance suggestion to the driver after the guidance request has been made. The guidance suggestion on this occasion can be given in such a way that a display as shown in FIG. 11A or FIG. 11B is presented on the display means 106. As seen from FIG. 11A or FIG. 11B, it is suggested to pass the search starting intersection of the higher level and to run to the nearest intersection of the higher level. The path and the intersection which have been selected are highlighted. A prompt "PLEASE RUN TO ROAD XX AND DRIVE TOWARD INTERSECTION XX" may well be displayed or sounded. Owing to the guidance process, the driver's path guidance request can be quickly responded to. By the way, it is also allowed that, even when the driver does not make the path search/guidance request, the path extending from the current position to the road of the higher level may well be searched for beforehand, thereby making it possible to quickly cope with the request. In this case, the search for the path extending to the road of the higher level is made periodically in accordance with the computing capability Of the on-vehicle system.

Figure 10:
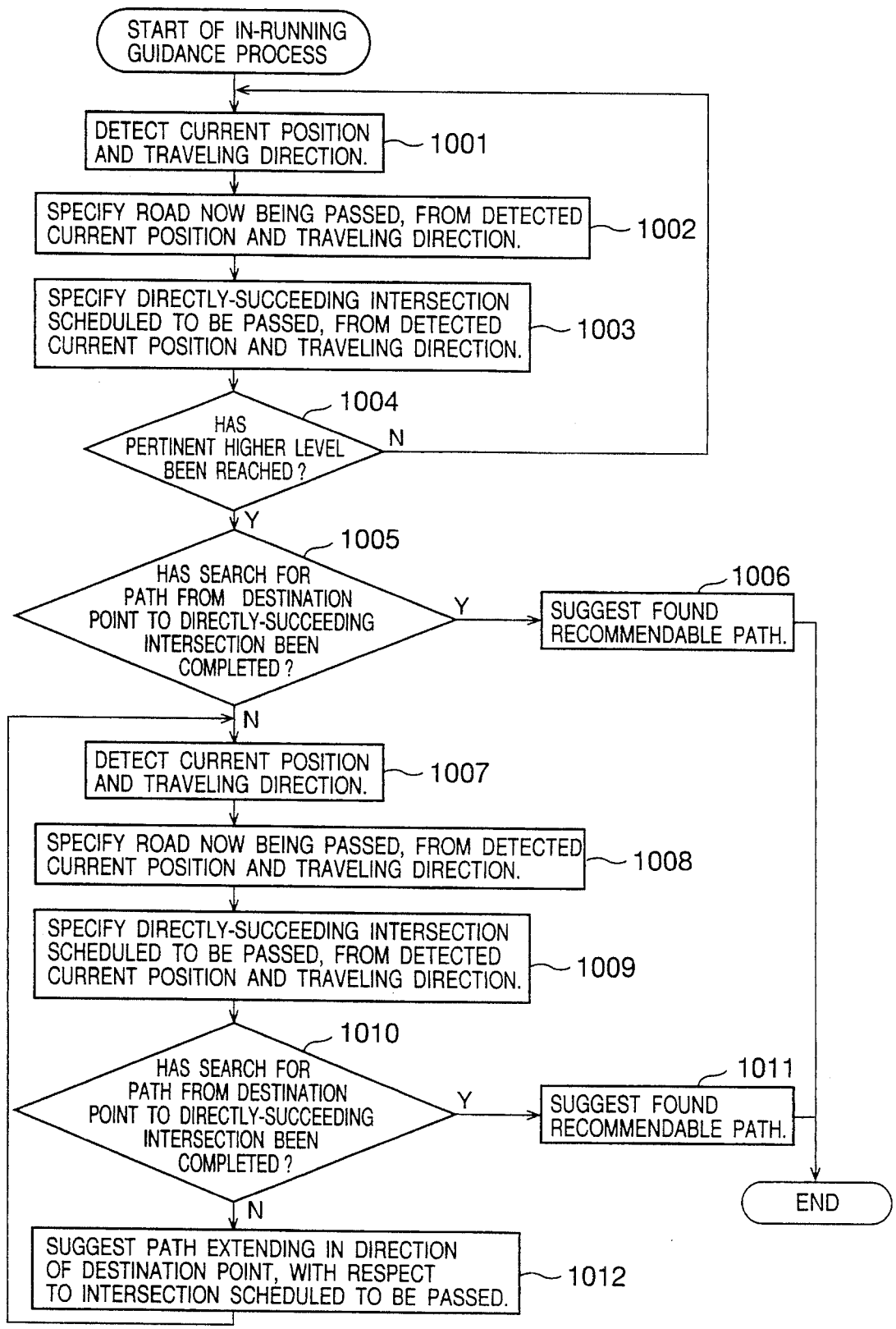
FIG. 10 is a flow chart showing the processing steps of an in-running guidance process.

After having offered the guidance suggestion as shown in FIG. 11A or FIG. 11B, the on-vehicle navigation system begins a search for a path extending to the destination point, with a search starting point "NODE O (origin)" set at the intersection which connects to the road of the higher hierarchy. Simultaneously, the system executes an in-running guidance process illustrated in FIG. 10.

In a case where the driver has started the running of the vehicle in compliance with the first or temporary guidance suggestion, a guidance suggestion (in-running guidance suggestion) is given in such a way that the information of the intersection located in the traveling direction of the vehicle is offered even when the path search has not ended yet. The in-running guidance suggestion is given every predetermined distance, and the path search is carried forward during the idle time periods of the in-running guidance process.

Figure 11C:
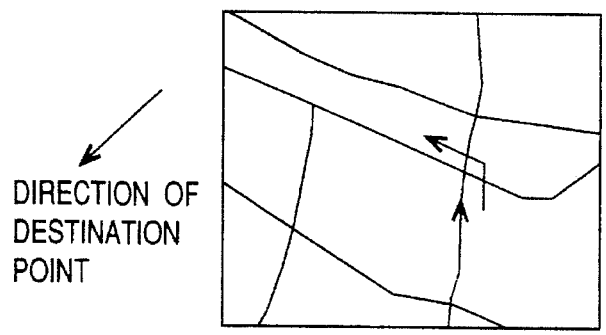

Concretely, before the vehicle reaches the road of the higher hierarchy searched for in accordance with the flow of FIG. 9 in advance (step 1004), the first guidance suggestion shown in FIG. 11A or FIG. 11B is given (steps 1001 thru 1003). After the higher level has been reached (step 1004), the in-running guidance suggestion toward the destination point is given (steps 1007 through 1009 and 1012) on condition that the search for the path extending from the destination point to the directly-succeeding intersection scheduled to be passed is not completed (steps 1005 and 1010). That is, before the path search ends, the in-running guidance suggestion toward the destination point is displayed as shown in FIG. 11C. Herein, a prompt "PLEASE TURN TO LEFT AT NEXT INTERSECTION" may well be displayed or sounded.

Further, on condition that the search for the path extending from the destination point to the directly succeeding intersection scheduled to be passed is completed (step 1005 or 1010), the navigation system guides in accordance with the found path thenceforth (step 1006 or 1011).

Meanwhile, in the case of making the search in any of the above processes, a distance cost may well be reduced depending upon the sorts of roads, etc. Thus, the road of the upper level can be selected more preferentially. By way of example, when letter X is let denote the distance between nodes, an express highway is set at 0.7X, a national road at 0.8X, and a major local road at 0.9X with respect to the sorts of the roads, and a width greater than 1.3 [m] is set at 0X, a width of 5.5 [m] to 13 [m] at 0.05X, and a width less than 5.5 [m] at 0.1X with respect to the widths of the roads. Further, the sum of both the values is set as the cost. As a result, the cost of the major local road having the width of S. 5 (m) to 13 [m] becomes 0.9x+0.05X–0.95x. In this case, even when all the roads are managed at a single level without hierarchizing and managing the road data as illustrated in FIGS. 3A and 3B, the road suited to the movement of the vehicle can be Selected. Therefore, similar effects can be expected.

Figure 12:
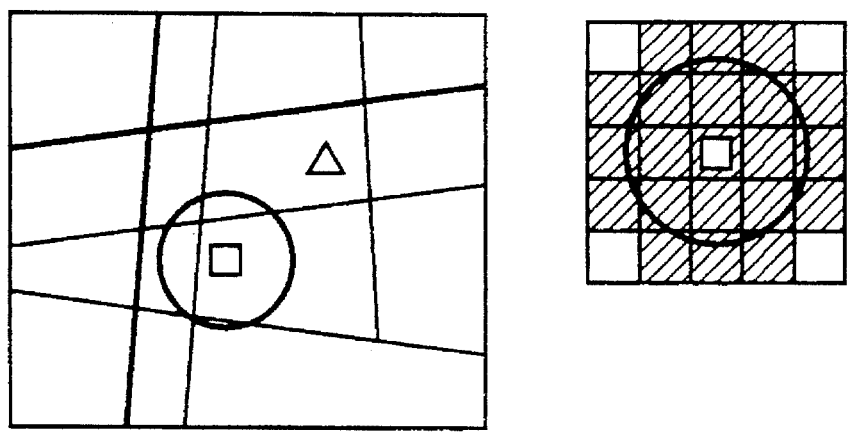
FIG. 12 is a diagram showing management areas contained in a candidate search area to-be-searched which is set to be circular.

In addition, the candidate search area to-be-searched need not always be set at the square of the predetermined distance (denoted by X) of each of the hierarchies, but the divisional map data contained on and within a circle whose diameter is X as illustrated in FIG. 12 may well be extracted. In this case, the center of the circle is set as a search starting point at the pertinent level. Thus, the candidate search area can be rendered smaller in size. In the case of FIG. 12, white parts (cells not hatched) in the right diagram thereof can be omitted from the candidate search area.

Figure 13:
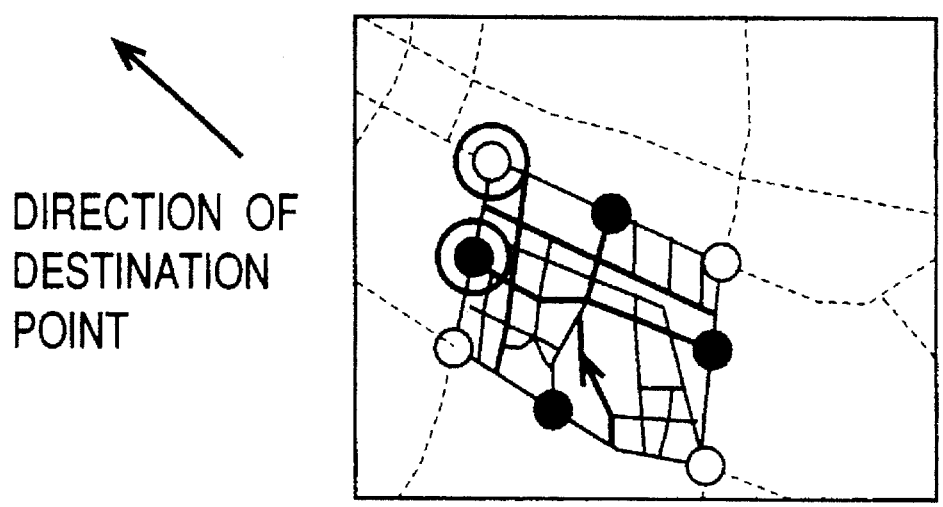
FIG. 13 is a diagram showing the situation of the determination of a search starting point in a higher hierarchy.
Figure 14A:
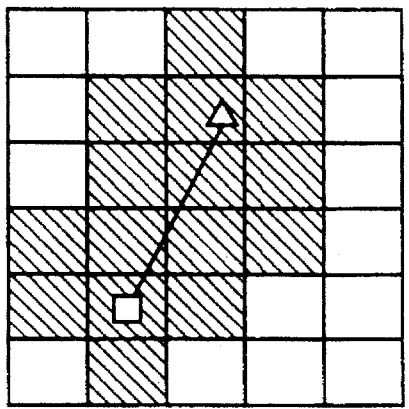
FIGS. 14A and 14B are diagrams showing a path search technique in the prior art.
Figure 14B:
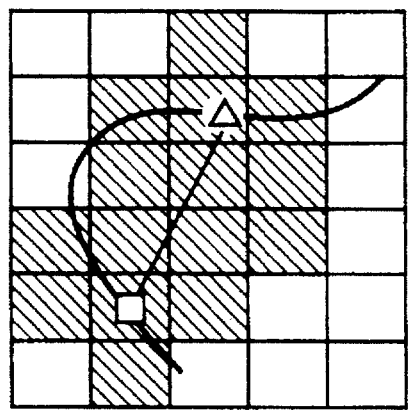
Figure 15A:
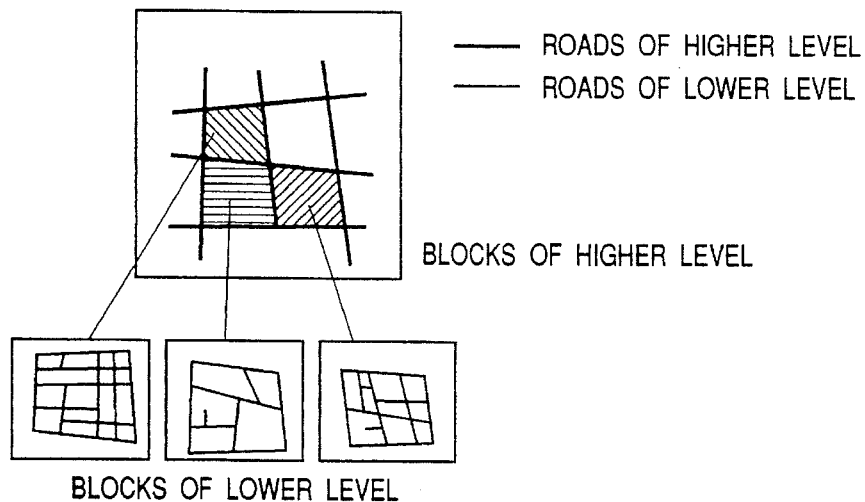
FIGS. 15A through 15C are diagrams showing another path search technique in the prior art.
Figure 15B:
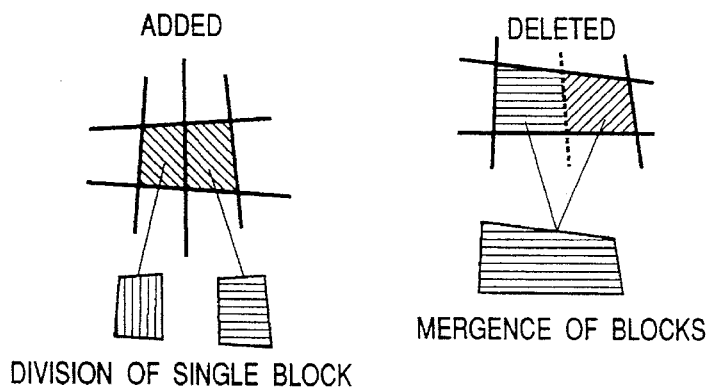
Figure 15C:
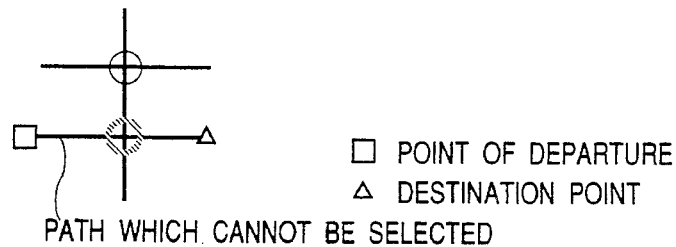

Besides, in the case of searching for the path which extends to the higher level, the single node which can be reached at the minimum cost need not always be selected. Alternatively, as illustrated in FIG. 13, a plurality of nodes which exist around the search starting point and which connect with the respective roads of the higher level are searched for beforehand, and one of the nodes is selected as a search starting point at the higher level on the basis of the direction of the opposite search starting point (on the side of the destination point as opposed to the side of the point of departure) and the traveling direction of the vehicle. Thus, a more preferable path can be selected. In the case of FIG. 13, among the intersections between the roads of the higher level, the intersection which is near the direction of the destination point and which is included within a predetermined angular extent from the traveling direction is set as the search starting point at the higher level.

It is also allowed that traffic control information items (such as "no right or left turn" and "one way") are contained in the road data as the attributes of roads, and that a path search is made considering the control information. By way of example, in a case where the vehicle could not enter any of the higher-level roads included in the real search area, the data contained in the candidate search area are first checked. When any enterable road at the higher level is not found yet, the areal size of the candidate search area is enlarged. Besides, in a case where the road on which the vehicle is running is an unforked road at the pertinent level and where the vehicle cannot go to any place without passing along the road, a lower-level road which connects with the road of the pertinent level and which permits the vehicle to shift to another path is searched for. Incidentally, when the pertinent level is the lowermost one on this occasion, a U-turn is suggested.

Moreover, in a case where local information items (such as information on a traffic snarl and information on a traffic regulation ascribable to, e.g., construction work) possessed by external information sources are acquired from a beacon or the like installed on a road, a path search can be made considering the local information.

As thus far described, according to this embodiment, a path search range is set flexibly in accordance with a regional situation at the time of a search operation, so that the omission of the optimum path from within the search range as in the case of a fixed range can be prevented.

In addition, since most of roads are general roads, objects to be searched for can be efficiently limited.

Besides, in the management of map data, the data are not divided depending upon the situations of roads, so that the maintenance of the data is facilitated.

Further, a guidance suggestion can be promptly given.

In guiding a vehicle, the navigation system guides the vehicle quickly to a higher level affording an easier movement, whereby the vehicle can be driven comfortably.

A path extending to a road of higher level is computed near a current point (a point of departure) beforehand, whereby a path can be suggested immediately after the driver of a vehicle has set a destination point.

As described above, according to the present invention, it is possible to provide a navigation system in which a more preferable path can be quickly searched for by using map data in a form easy of maintenance.

What is claimed is:

1. A navigation system for installation on a vehicle for providing a recommendable path from a departure point or a current position of the vehicle to a destination point, comprising:

storage means for storing therein road data representing roads of an area, wherein said road data comprises road shape data and network data, said road shape data representing sorts and shapes of said roads, and said network data comprising node data representing intersections and link data representing connections between the intersections, said roads being classified into a plurality of hierarchies in accordance to the type of roads, said road data being divided into a plurality of hierarchized data, each hierarchized data corresponding to one of said hierarchies, each said hierarchized data being divided into a plurality of data units, each said data unit of a hierarchized data corresponding to a management area representing a particular geographical area of predetermined extent and shape;

position means for detecting said current position of the vehicle;

set input means for accepting setting of said destination point; and path search means for searching for a recommended path which extends from a given point of departure or said current position of the vehicle to the destination point, said path search means making a search for said recommended path in such a way that said path search means searches partial paths of said recommended path in the respective hierarchies sequentially, each of said partial paths being searched on the basis of the road data units corresponding to the combination of the management area contained in a search area of the hierarchy in which the partial path is to be searched, and the hierarchy in which the partial path is to be searched, each of said partial paths being formed of the road or roads in the hierarchy in which the partial path is to be searched, and said search area of the hierarchy being an area having a breadth predetermined so that the search area of a higher hierarchy has a broader breadth.

2. A navigation system as defined in claim 1, wherein said path search means makes the search for the partial paths in such a way that nodes connecting with the road in higher ones of said hierarchies and the partial paths extending to the nodes are searched for from the point of departure and from said destination point, sequentially in the respective hierarchies, from the hierarchies corresponding to said point of departure and said destination point up to the hierarchy directly lower than the hierarchy selected as a final hierarchy for search, said final hierarchy being selected in such a manner that the higher hierarchy is selected as said final hierarchy for search when a distance between said point of departure and said destination point is longer, and that the remaining partial path is searched for between the nodes which have been searched for and which connect with said roads in said hierarchy selected as the final hierarchy.

3. A navigation system as defined in claim 1, wherein said path search means searches for a node connecting with the road in the hierarchy which is directly higher than the hierarchy corresponding to said current position, and a path extending to the node, from said current position, before said destination point is accepted by said set input means, and said path search means searches for said recommended path extending from the point of departure to said destination point, under a condition that said node connecting with said road in the directly higher hierarchy is set as said point of departure, after said destination point has been accepted; and said guidance means guides the running of said vehicle on the basis of the path which extends to said node connecting with said road in said directly higher hierarchy and which has been searched by said path search means, immediately after said destination point has been accepted.

4. A navigation system for installation on a vehicle, comprising:

storage means for storage therein road data for representing roads, wherein said roads data comprises network data which represents nodes representing connection points of nodes and links representing connections of the nodes, and shape data which represents sorts and shapes of roads, said roads are classified as to hierarchies and management areas, and said road data are divided into a plurality of road data units for each of a plurality of combinations of the hierarchy and the management area in which corresponding roads are classified, each of said hierarchies corresponding to each of a plurality of sorts of road, and said management areas being geographical areas of predetermined extent and shape;

positioning means for detecting a current position and a traveling direction of the vehicle;

set input means for accepting setting of a destination point;

path search means for searching for a recommended path which extends from a given point of departure to the destination point; and guidance means for guiding running of said vehicle on the basis of the current position measured by said positioning means and the recommended path searched for by said path search means;

said path search means setting candidate areas to the hierarchies sequentially from the hierarchy which corresponds to the point of departure to the hierarchy to which the candidate area contains said destination point is set under a condition that the candidate areas set to the higher hierarchies have broader breadth; then setting a search area to-be-searched in correspondence with a position and the breadth of the candidate which contains said destination point; and subsequential making the search for said recommended path on the basis of the road data units corresponding to the combinations including the management area contained in said search area.

5. A navigation system for installation on a vehicle, comprising:

storage means for storing therein road data for representing roads, wherein said roads data comprises network data which represents nodes representing connection points of nodes and links representing connections of the nodes and shape data which represents sorts and shapes of roads, said roads are classified as to hierarchies and management areas, and said road data are divided into a plurality of road data units for each of a plurality of combinations of the hierarchy and the management area in which corresponding roads are classified, each of said hierarchies corresponding to each of a plurality of sorts of road, and said management areas being geographical areas of predetermined extent and shape;

first setting means for setting a point of departure as a first search starting point, setting the hierarchy in which the nearest road to the first search starting point is contained as a first search hierarchy, and setting a first candidate search area around said first search starting point, and repeating a process of renewing the first search hierarchy and the first candidate search area until the destination point is contained in the first candidate search area, said process being for searching for a partial path which extends onto the road belonging to the hierarchy directly higher than the current first search hierarchy on the basis of the road data units corresponding to the combinations of the management area contained in the current first candidate search area and hierarchy corresponding to the current first search hierarchy, renewing the first search starting point to an end point of the searched partial path, renewing the first search hierarchy to the hierarchy directly higher than a current first search hierarchy, and renewing the first candidate search area around the renewed first search starting point;

second setting means for setting said destination point as a second search starting point, setting the hierarchy in which the nearest road to the second search starting point is contained as a second search hierarchy, and setting a second candidate search area around the second search starting point;

third setting means for setting an area which circumscribes the current first candidate search area and the second candidate search area as a search area after said repeating of said process has been finished; and recommended path generating means for searching, after said search area has been set, for a remaining partial path extending between the current first search starting point and the current second search starting point on the basis of said road data units corresponding to the combinations including said management area contained in the search area, and subsequently connecting the partial paths searched by said process with the remaining partial path, thereby obtaining a recommended path which extends from the point of departure to said destination point;

the first candidate search area being set so as to have broader breadth when the current first hierarchy is higher, and the second candidate search area being set so as to have broader breadth when the second hierarchy is higher.

6. A navigation system for installation on a vehicle, comprising:

storage means for storing therein road data for representing roads, wherein said roads data comprises network data which represents nodes representing connection points of nodes and links representing connections of the nodes, and shape data which represents sorts and shapes of roads, said roads are classified as to hierarchies and management areas, and said road data are divided into a plurality of road data units for each of a plurality of combinations of the hierarchy and the management area in which corresponding roads are classified, each of said hierarchies corresponding to each of a plurality of sorts of road, and said management areas being geographical area of predetermined extent and shape;

partial path searching means for setting a point of departure as a first search starting point, setting the hierarchy in which the nearest road to the first search starting point is contained as a first search hierarchy, and setting a first candidate search area around said first search starting point, setting said destination point as a second search starting point, setting the hierarchy in which the road nearest the second search starting point is contained as a second search hierarchy, setting a second candidate search area around the second search starting point, repeating a first process of renewing the first search hierarchy and the first candidate search area until the destination point is contained in the first search hierarchy, then repeating said first process until said first search hierarchy become equal to the second search hierarchy when the current first search hierarchy is lower than the second search hierarchy, and then repeating a second process of renewing the second search hierarchy and the second candidate search area until said second search hierarchy becomes equal to the current first search hierarchy when the second search hierarchy is lower than the current first search hierarchy, said first process being for searching for a partial path which extends onto the road belonging to the hierarchy directly higher than the current first search hierarchy on the basis of the road data units corresponding to the combinations of the management area contained in the current first candidate search area and hierarchy corresponding to the current first search hierarchy, renewing the first search starting point to an end of the searched partial path, renewing the first search hierarchy to the hierarchy directly higher than the current first search hierarchy, and renewing the first candidate search area around the renewed first search starting point;

said second process being for searching for a partial path which extends onto the road belonging to the hierarchy directly higher than the current second search hierarchy on the basis of the road data units corresponding to the combinations of the management area contained in the current second candidate search area and hierarchy corresponding to the current second search hierarchy, renewing the second search starting point to an end point of the searched partial path, renewing the second search hierarchy to the hierarchy directly higher than the current second search hierarchy, and renewing the second candidate search area around the renewed second search starting point;

second setting means for setting an area which circumscribes the current first candidate search area and the current candidate search area as a search area after said repeating of said first process; and recommended path generating means for, after that said search area has been set, searching for a remaining partial path extending between the current first search starting point and the current second search starting point on the basis of said road data units corresponding to the combinations including said management area contained in the search area, and subsequently connecting the partial paths searched by said first process and said second process with the remaining partial path, thereby obtaining a recommended path which extends from the point of departure to said destination point;

the first candidate search area being set so as to have broader breadth when the current first hierarchy is higher, and the second candidate search area being set so as to have broader breadth when the second hierarchy is higher.

* * * * *